US011043203B2

(12) United States Patent
Herman et al.

(10) Patent No.: US 11,043,203 B2
(45) Date of Patent: Jun. 22, 2021

(54) MODE SELECTION FOR MODAL REVERB

(71) Applicant: Eventide Inc., Little Ferry, NJ (US)

(72) Inventors: Woodrow Q. Herman, New York, NY (US); Russell Wedelich, Bronx, NY (US); Corey Kereliuk, Frederiksberk (DK)

( * ) Notice: Subject to any disclaimer, the term of this patent is extended or adjusted under 35 U.S.C. 154(b) by 90 days.

(21) Appl. No.: 16/585,018

(22) Filed: Sep. 27, 2019

(65) Prior Publication Data

US 2021/0097972 A1 Apr. 1, 2021

(51) Int. Cl.
*G06F 17/00* (2019.01)
*G10K 15/08* (2006.01)
*G10L 25/18* (2013.01)

(52) U.S. Cl.
CPC .............. *G10K 15/08* (2013.01); *G10L 25/18* (2013.01)

(58) Field of Classification Search
CPC ................................ G10K 15/08; G10L 25/18
USPC ........................................................... 700/94
See application file for complete search history.

(56) References Cited

U.S. PATENT DOCUMENTS 10,262,645 B1 4/2019 Abel
2006/0245601 A1* 11/2006 Michaud ................ H04R 3/005 381/92
2008/0285775 A1* 11/2008 Christoph ................ H04R 3/14 381/99
2010/0262420 A1* 10/2010 Herre ...................... G10L 19/20 704/201

OTHER PUBLICATIONS

Esteban Maestre et al: "Constrained Pole Optimization for Modal Reverberation", Proceedings of the 28 th International Conference on Digital Audio Effects, Sep. 9, 2817 (2817-89-89), pp. 381-388, XP855761179, Retrieved from the Internet: URL:http:jjwww.dafx17.eca.ed.ac.ukjpapers/DAFx17 paper 95.pdf [retrieved on Dec. 17, 2828].

Valimaki Vesa et al: "More Than 58 Years of Artificial Reverberation", Conference: 68th International Conference: Dreams (Dereverberation and Reverberation of Audio, Music, and Speech); Jan. 2016, AES, 68 East 42nd Street, Room 2528 New York 18165-2528, USA, Jan. 27, 2816 (2816-81-27), XP848688591.

International search Report including Written Opinion for PCT/US2020/052369 dated Jan. 13, 2021; 13 pages.

Abel et al., A Modal Architecture for Artificial Reverberation with Application to Room Acoustics Modeling, Audio Engineering Society Convention Paper 9208, 137th Convention, Los Angeles, USA, Oct. 9-12, 2014, 10 pages.

(Continued)

*Primary Examiner* — Paul C McCord
(74) *Attorney, Agent, or Firm* — Lerner, David, Littenberg, Krumholz & Mentlik, LLP

(57) ABSTRACT

Methods and systems for performing modal reverb techniques for audio signals are described. The method may involve simplifying a reverb effect to be applied to the audio signal by receiving an IR, dividing the IR into a plurality of sub-bands, using a parametric estimation algorithm to determine respective parameters of the modes included in each sub-band, aggregating the respective modes of the sub-bands into a set; and truncating the set of aggregated modes into a subset of modes. Reverberation of the audio signal may be manipulated based on an IR that itself is based on the truncated subset of modes.

18 Claims, 5 Drawing Sheets

500

(56) References Cited

OTHER PUBLICATIONS

Balázs Bank, Direct Design of Parallel Second-Order Filters for Instrument Body Modeling, International Computer Music Conference, Proceedings vol. I. pp. 458-465, Copenhagen, Denmark, Aug. 2007.

Jean Laroche, A New Analys/Sisynthesis System of Musical Signals Using Prony's Method. Application to Heavily Damped Percussive Sounds., International Conference on Acoustics, Speech, and Signal Processing, May 23-26, 1989, IEEE Xplore: Aug. 6, 2002, pp. 2053-2056.

Kereliuk et al, Modal Analysis of Room Impulse Responses Using Subband Esprit, Proceedings of the 21st International Conference on Digital Audio Effects (DAFx-18), Aveiro, Portugal, Sep. 4-8, 2018, pp. DAFx-334-341.

Paatero et al., New digital filter techniques for room response modeling, Audio Engineering Society Conference Paper, Presented at the 21st International Conference, Jun. 1-3, 2002 St. Petersburg, Russia, 10 pages.

Sirdey et al., ESPRIT in Gabor frames, AES 45th International Conference, Helsinki, Finland, Mar. 1-4, 2012, pp. 1-9.

* cited by examiner

200

300

500

MODE SELECTION FOR MODAL REVERB

BACKGROUND

Audio engineers, musicians, and even the general population (collectively "users") are accustomed to generating and manipulating audio signals. For instance, audio engineers edit stereo signals by mixing together monophonic audio signals using effects such as pan and gain to position them within the stereo field. Users also manipulate audio signals into individual components for effects processing using multiband structures, such as crossover networks, for multiband processing. Additionally, musicians and audio engineers regularly use audio effects, such as compression, distortion, delay, reverberation, etc., to create sonically pleasing, and in some cases unpleasant sounds. Audio signal manipulation is typically performed using specialized software or hardware. The type of hardware and software used to manipulate the audio signal is generally dependent upon the user's intentions. Users are constantly looking for new ways to create and manipulate audio signals.

Reverb is one of the most common effects users apply to an audio signal. The reverb effect simulates the reverberation of a specific room or acoustic space, thus causing an audio signal to sound as if it were recorded in a room having a specific impulse response.

One way of applying reverb to an audio signal is to use a technique called convolution. Convolutional reverb applies the impulse response of a given acoustic space to an audio signal, resulting in the audio signal sounding as if it were produced in the given space. However, the techniques for manipulating the parameters of a convolutional reverb are relatively limited. For instance, using convolutional reverb, it may not be possible to isolate and manipulate the resonance of a single frequency within the audio signal. Additionally, using convolutional reverb, it also may not be possible to adjust or manipulate a single property of a simulated physical space (e.g., the space's length, the space's width).

An alternative way of applying reverb to an audio signal is to use a technique called modal reverb. Unlike convolutional reverb, modal reverb analyzes the impulse response of a given space, identifies the modes of vibration in the given space based on the analysis, and then synthesizes the individual modes of vibration of the space. As a result, individual frequencies of the reverb can be isolated and edited, and the techniques for manipulating the parameters of a modal reverb are more robust than those for manipulating the parameters of a convolutional reverb technique.

One drawback of currently known modal reverb techniques is the degree of processing required. A reverberant audio signal is often composed of tens of thousands of modes of vibration, and the modal reverb technique must identify and process each of these modes in order to properly reconstruct the reverb being applied to the audio signal. Yet only about 3000-5000 modes can typically be processed without significantly taxing the processor. The amount of required processing can be reduced by dropping modes from the audio signal, but this has the unwanted effect of reducing quality of the audio signal.

Another drawback of modal reverb techniques is that it is difficult to identify all of the modes in an acoustic space. Previous techniques do not provide a high enough resolution to properly identify all of the modes. For example, in some example modal reverb techniques, the parameters of the modal reverb may be derived by first converting an impulse response of the audio signal in the acoustic space into the frequency domain using a Discrete Fourier Transform (DFT), and then identifying the peaks of the converted signal as the modes of the room. However, DFT-based mode identification has a low resolution. As a result of the low resolution, the simulated physical space can only be approximated, and cannot easily be scaled. Altogether, the DFT-based modal reverb technique may provide some manipulability of an audio signal, but with degraded quality, and with inaccurate scalability.

BRIEF SUMMARY

The present disclosure improves upon the known convolutional reverb techniques by introducing an algorithm that provides high-resolution estimates of modes of an acoustic space through analysis of a recording of an impulse response (IR) of the space. The algorithm does so by dividing the recording into a plurality of sub-bands, and then separately estimating frequency and damping parameters for each mode using a parametric estimation algorithm such as ESPRIT. The singular value decomposition (SVD) calculations performed by the ESPRIT algorithm scale approximately cubically with respect to the number of modes. This makes the ESPRIT algorithm intractable for the large number of modes present in a recording of an impulse response of a standard acoustic space. But with the modes of the space represented by the IR divided into separate sub-bands, the ESPRIT algorithm can be applied to each sub-band separately, thus reducing the processing normally needed for the algorithm. The modal parameters estimated by ESPRIT achieve a higher resolution than conventional DFT-based techniques. This allows a user to, for example, discriminate between modes of the space that overlap in frequency, which commonly occurs in IR recordings.

The same technique may also be implemented with recordings other than impulse responses. For instance, an audio recording of drum sounds may also be analyzed as a plurality of modes, and so dividing such a recording into sub-bands could similarly enable the ESPRIT algorithm to be applied in an analysis and for the recording to be modified based on modal parameters with a higher resolution than conventional DFT-based techniques.

The above-noted techniques may be further improved. For instance, the sub-bands may further be divided non-uniformly, such that the modes are divided approximately evenly among the sub-bands. Firstly, this has the benefit of reducing the required processing, for the reasons noted above. Additionally, the non-uniform division may improve resolution of the algorithm. For instance, the IR of the space may have a relatively high concentration of modes in one portion of the frequency spectrum, and a relatively low concentration of modes in another portion of the frequency spectrum. By selecting a relatively narrow sub-band for the portion of the audio spectrum that has a high concentration of modes, the resolution of the algorithm applied to the modes in the sub-band may be improved. Likewise, for portions of the spectrum having a low concentration of modes, a lower resolution may be acceptable and thus a wider sub-band may be chosen for applying the algorithm.

One aspect of the disclosure provides a method for generating a modal reverb effect for manipulating an audio signal. The method may involve: receiving an impulse response of an acoustic space, the impulse response including a plurality of modes of vibration of the acoustic space; dividing the impulse response into a plurality of sub-bands, each sub-band of the impulse response including a portion of the plurality of modes; for each respective sub-band, using a parametric estimation algorithm, determining respective parameters of the portion of modes included in the sub-band; aggregating the respective modes of the plurality of sub-bands into a set; and truncating the set of aggregated modes into a subset of modes. The method may further involve manipulating the audio signal based on the generated modal reverb effect.

In some examples, instead of receiving an impulse response of an acoustic space, an audio signal may be received. The audio signal may itself include a plurality of modes of vibration. As such, the remaining steps of the method may be applied to the audio signal, whereby the audio signal may be divided into sub-sands, analyzed using a parametric algorithm, and so on, such that modes of the audio signal may be truncated to result, whereby a modified audio signal is generated. As such, although the present disclosure provides examples of analysis of an "impulse response," those skilled in the art will recognize that the same type of analysis and principles may be applied to other audio signals, and that the examples herein are understood and contemplated to be applicable to audio signals as well.

In some examples, the impulse response may be divided into a plurality of non-uniform sub-bands. Dividing the impulse response into a plurality of sub-bands may involve passing the impulse response through a filter bank. For each respective sub-band signal, a number of modes included in the portion of modes of the sub-band signal may be estimated. The filter bank may include one or more complex filters and for each sub-band may have each of a passband width and a partition width narrower than the passband width. The number of modes may be estimated within the passband width. Determining parameters of the respective modes included in the sub-band signal may be performed for only the modes within the partition width.

In some examples, the method may further involve, for each respective sub-band, estimating a number of modes included in the portion of modes of the sub-band.

In some examples, a model order of the parametric estimation algorithm applied to the sub-band may be based on the estimated number of modes included in the portion of modes of the sub-band.

In some examples, estimating a number of modes included in the portion of modes of the sub-band may involve: determining a peak selection threshold for the sub-band; and determining a number of peaks detected within the sub-band that are greater than the peak selection threshold. The estimated number of modes may be based on the determined number of peaks.

In some examples, the sub-band may be derived from a Discrete Fourier Transform (DFT) of the impulse response, and determining a peak selection threshold for the sub-band may involve: detecting a maximum peak magnitude of the sub-band; and detecting a minimum peak magnitude of the sub-band. The peak selection threshold may be determined based at least in part on the maximum peak magnitude and the minimum peak magnitude.

In some examples, the peak selection threshold may be determined based on: $t=M_{max}-a(M_{max}-M_{min})$, whereby $M_{max}$ may be the maximum peak magnitude, $M_{min}$ may be the minimum peak magnitude, and a may be a predetermined value between 0 and 1.

In some examples, for each respective sub-band, determining respective parameters of the portion of modes may involve, for each sub-band to which the parametric estimation algorithm is applied, determining one or more of a frequency, a decay time, an initial magnitude or an initial phase of the portion of modes included in the sub-band.

In some examples, for each respective sub-band, determining respective parameters of the portion of modes may further involve estimating a complex amplitude for each respective mode included in the sub-band.

In some examples, the sub-band may be derived from a Discrete Fourier Transform (DFT), and for each mode included in the sub-band signal, estimating the complex amplitude may involve minimizing an approximation error for each of the estimated complex amplitudes of the sub-band signal.

In some examples, the approximation error may be minimized for only modes of the sub-band signal that fall within a passband of a corresponding spectral filter. A different spectral filter may correspond to each of the sub-band signals, and the different spectral filters may cover the audible spectrum without overlapping.

In some examples, the parametric estimation algorithm may be an ESPRIT algorithm.

In some examples, for each respective sub-band, determining respective parameters of the portion of modes may involve determining a peak selection threshold for the sub-band, and the parameters may be determined for the modes included in the portion of modes and may have an amplitude greater than the peak selection threshold.

In some examples, truncating the set into a subset of modes may involve, for each of the modes included in the set, determining a signal-to-mask ratio (SMR) of the mode based on a predetermined masking curve. One or more of the modes included in the set may be truncated based on the determined SMR.

In some examples, truncating the set into a subset of modes may further involve: receiving an input indicating a total number of modes, the total number of modes being less than or equal to a number of modes included in the set; and truncating the set into a subset of modes having a number of modes equal to the total number of modes.

In some examples, truncating the set into a subset of modes may further involve sorting the modes included in the set according to the SMR for each mode. Each mode included in the subset may have an SMR greater than the SMR of each mode excluded from the subset.

In some examples. the predetermined masking curve may be based on a psychoacoustic model.

Another aspect of the disclosure provides for a system for generating a modal reverb effect for manipulating an audio signal. The system may include memory for storing an impulse response, and one or more processors. The one or more processors may be configured to: receive an impulse response of an acoustic space, the impulse response including a plurality of modes of vibration of the acoustic space; divide the impulse response into a plurality of sub-bands, each sub-band of the impulse response including a portion of the plurality of modes; for each respective sub-band, estimate a number of modes included in the portion of modes of the sub-band, and using a parametric estimation algorithm determine respective parameters of the portion of modes included in the sub-band signal; aggregate the respective modes of the plurality of sub-bands into a set; and truncate the set of aggregated modes into a subset of modes.

BRIEF DESCRIPTION OF THE DRAWINGS

The foregoing aspects, features and advantages of the present invention will be further appreciated when considered with reference to the following description of exemplary embodiments and accompanying drawings, wherein like reference numerals represent like elements. In describing the embodiments of the invention illustrated in the drawings, specific terminology may be used for the sake of clarity. However, the aspects of the invention are not intended to be limited to the specific terms used.

DETAILED DESCRIPTION

Figure 1:
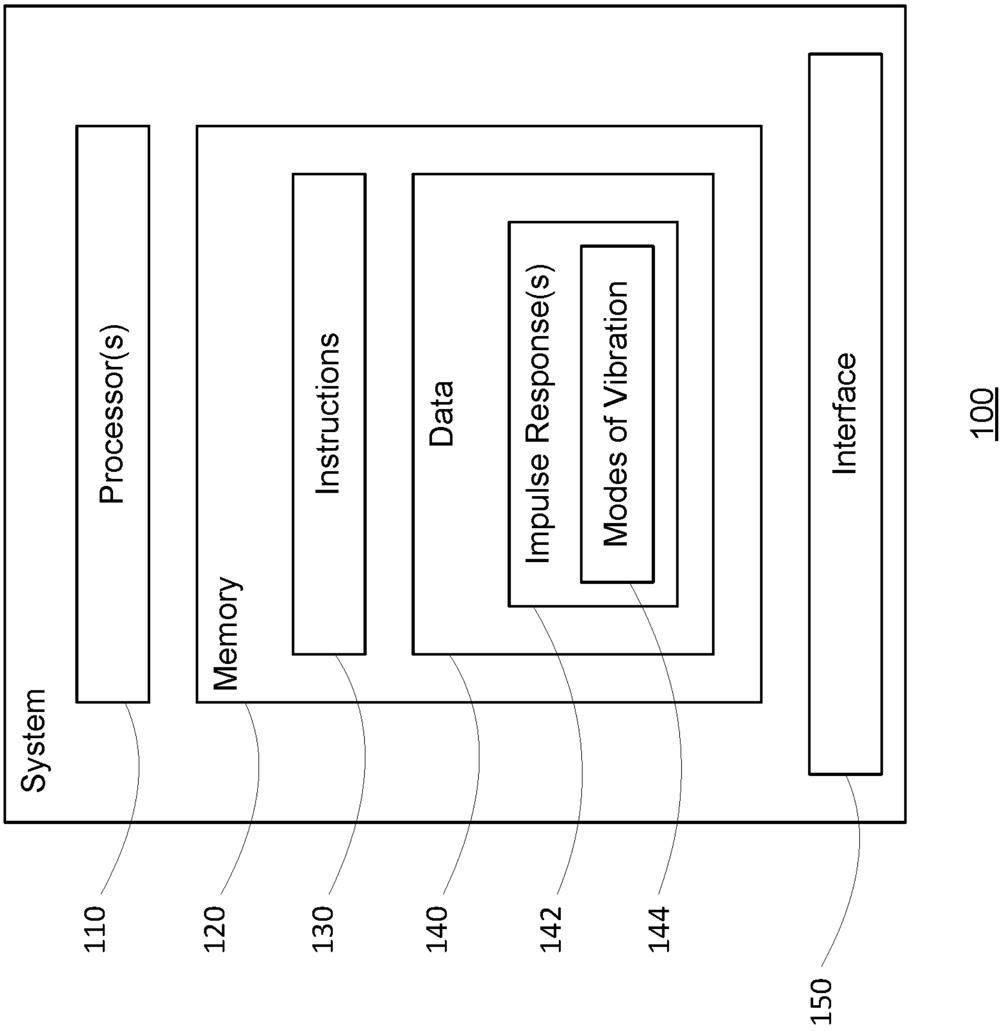
FIG. 1 is a block diagram of an example system according to an aspect of the present disclosure.

FIG. 1 illustrates an example system 100 for performing the modal reverb and mode selection techniques described in the present application. The system 100 may include one or more processing devices 110 configured to execute a set of instructions or executable program. The processors may be dedicated components such as general purpose CPUs, or application specific integrated circuit ("ASIC"), or may be other hardware-based processors. Although not necessary, specialized hardware components may be included to perform specific computing processes faster or more efficiently. For example, operations of the present disclosure may be carried out in parallel on a computer architecture having multiple cores with parallel processing capabilities.

Various instructions are described in greater detail in connection with the flow diagrams of FIGS. 2, 3 and 5. The system may further include one or more storage devices or memory 120 for storing the instructions 130 and programs executed by the one or more processors 110. Additionally, the memory 120 may be configured to store data 140, such as one or more IRs 142, and one or more modes 144 identified from an IR. For example, the IR 142 may be chosen by a user who wishes to apply a reverb effect to an audio signal. The reverb effect may be applied by identifying and synthesizing the modes 144 of the selected IR (e.g., the plurality of modes of a room that produces the IR when the audio signal is played in that room). The data may further include information regarding the plurality of modes of the space. For sake of simplicity, these modes are also referred to herein as "modes of the IR." As described below, the information regarding the modes may be estimated using algorithms included in the instructions 130.

The system 100 may further include an interface 150 for input and output of data. For example, the IR for a given acoustic space may be input to the system via the interface 150, and a select number of modes or corresponding exponentially damped sinusoids (EDSs) and their parameters may be output via the interface 150. Alternatively or additionally, the one or more processors may be capable of performing the reverb operations, in which case a user may input desired reverb parameters via the interface 150, and a modified audio signal based on the reverb parameters may be generated and output via the interface 150. Other parameters and instructions may be provided to and from the system via the interface 150. For example, the number of modes to be identified in the IR may be a variable entered by the user. This may be used to vary the processing speed of the reverb operations depending on a preference of the user. A desired number of modes may be preset and stored in the memory 140, entered by the user via the interface 150, or both.

In some examples, the system 100 may include a personal computer, laptop, tablet, or other computing device of the user, housing therein both processors and memory. Operations performed by the system are described in greater detail in connection with the routines of FIGS. 2, 3 and 5.

Figure 2:
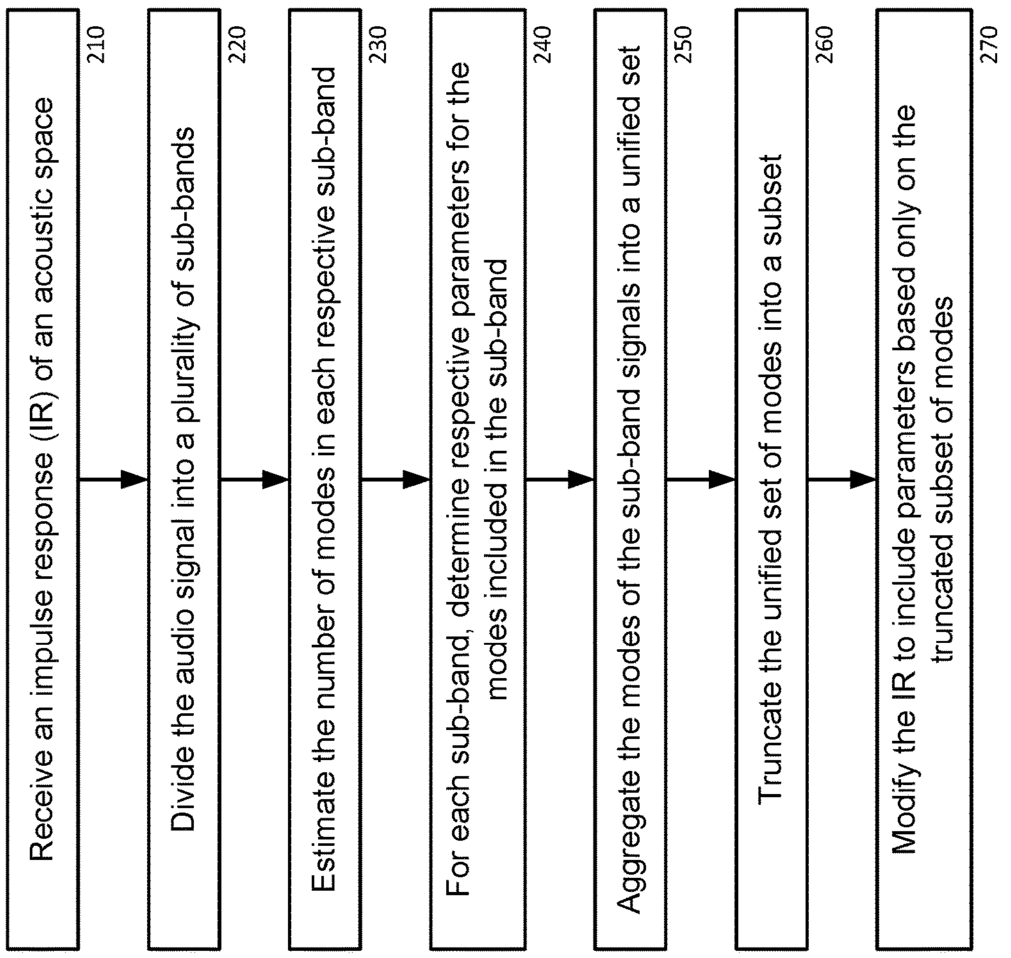
FIG. 2 is a flow diagram of an example method according to an aspect of the present disclosure.

FIG. 2 is a flow diagram illustrating an example routine 200.

At block 210, the system receives an IR of a given space. The space may be a real space (whereby the IR may be a recording in response to an impulse played in the real space), or a simulated or virtual space. The IR can be broken down into the respective modes of vibration of the space simulated by the IR and these modes can be isolated and individually modified. A typical IR may include upwards of approximately 10,000 modes.

At block 220, the system may divide the IR into a plurality of sub-bands. For example, the modes of the IR may be centered at various frequencies across a wide band of frequencies, generally on the range of audible frequencies (commonly considered to be about 20 Hz-20 kHz). This band may be broken up into a plurality of sub-bands, each sub-band having a bandwidth smaller than the full band of the IR. In some examples, the sub-bands may be chosen so that they do not overlap, so that all of the frequencies within the full band of the IR are accounted for, or both. If both considerations are met, then the sum of the sub-band bandwidths may equal the bandwidth of the complete IR.

In some examples, the sub-bands may be chosen to have uniform bandwidth, either on a logarithmic or non-logarithmic scale. For instance, if the IR is broken up into three sub-bands, each sub-band may have an equal bandwidth. In other examples, the IR may be divided into sub-bands based on a different factor, and this may result in non-uniformity of the sub-band bandwidths. For instance, the sub-band division may be arranged to divide the modes of the complete IR approximately evenly.

In some examples, dividing the complete IR may first involve down-sampling the complete IR using one or more filterbanks. The filterbanks may be configured to pass certain portions of the IR, whereby the IR may be filtered into different sub-bands.

Additionally, in some examples, the down-sampling may be performed using one or more complex filters. The complex filters may retain only a positive frequency spectrum of the IR, thereby omitting unwanted portions of the filtered IR from later processing operations.

At block 230, a number of modes in each respective sub-band is estimated. The estimated number of modes may inform whether the sub-bands have been divided evenly. Additionally, or alternatively, the estimated number of modes may inform a desired resolution for later operations of the routine.

Figure 3:
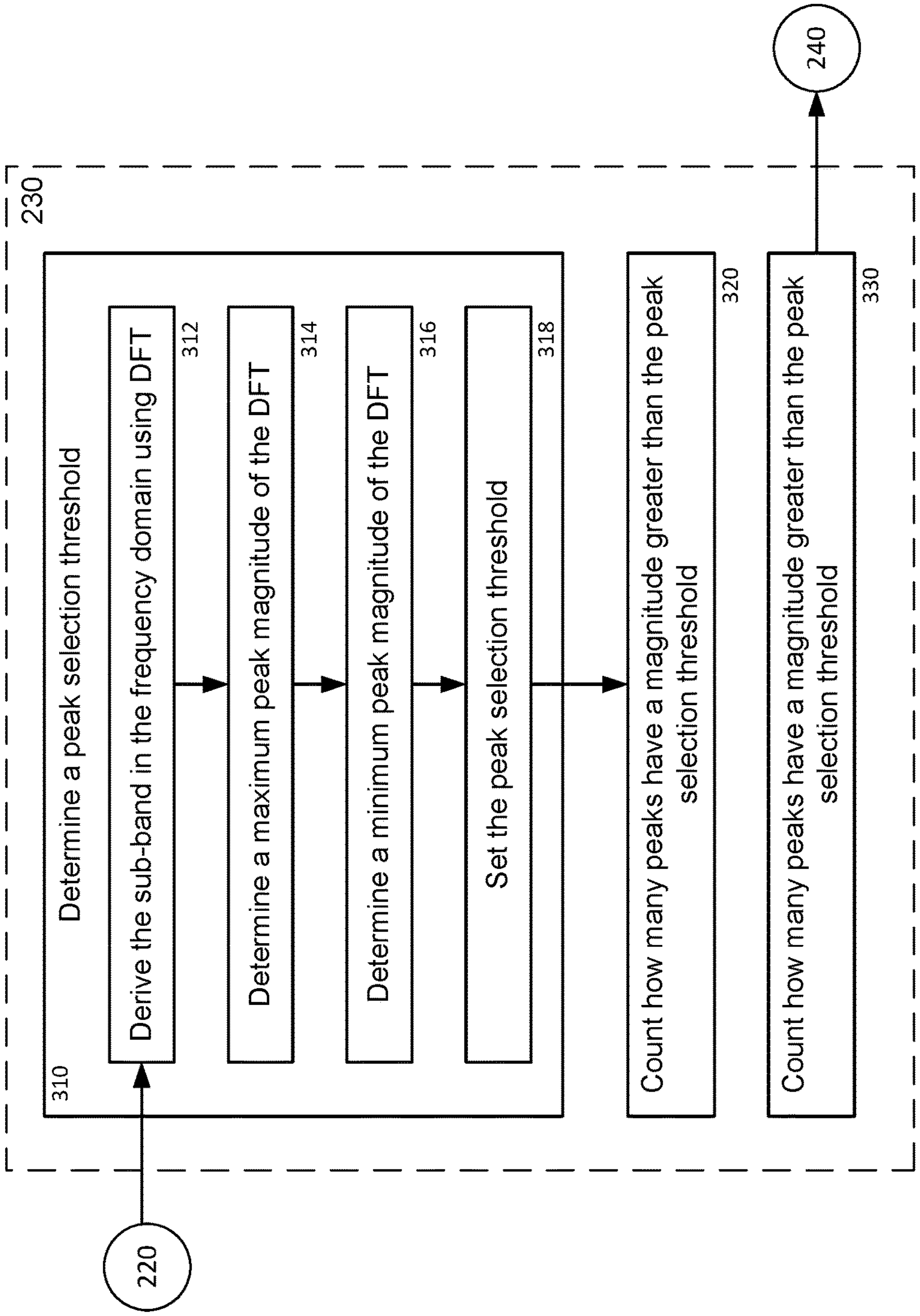
FIG. 3 is a flow diagram of an example sub-routine of the method illustrated in FIG. 2.

An example subroutine 300 for estimating a number of modes in a given sub-band is shown in the flow diagram of FIG. 3.

At block 310, a peak selection threshold for the sub-band may be determined. In some examples, the peak selection threshold may be a fixed value, such as an amplitude value representing a lowest audible volume. Amplitude values of the sub-band at sampled frequencies (e.g., using a Fourier transform method) may be determined and then compared to the peak selection threshold, whereby only those values at or above the peak selection threshold are determined to be modes of the IR.

In some examples, the peak selection threshold may be determined based on characteristics of the sub-band itself. For instance, at block 312, the sub-band may be derived in the frequency domain using a discrete Fourier transform (DFT). Then, at block 314, a maximum peak magnitude of the DFT of the sub-band may be determined, and at block 316, a minimum peak magnitude of the DFT of the sub-band may be determined. At block 318, the peak selection threshold is set based on the maximum peak and the minimum peak. For instance, the formula: $t=M_{max}-a(M_{max}-M_{min})$, may be used to set a peak selection threshold t, whereby $M_{max}$ is the maximum peak magnitude, $M_{min}$ is the minimum peak magnitude, and a is predetermined value between 0 and 1. The predetermined value of a may be 0.25.

At block 320, the number of peaks detected within the sub-band that have a magnitude greater than the peak selection threshold value are counted. The remaining peaks in the DFT are disregarded as insignificant or inaudible. The counted number of peaks corresponds to the estimated number of modes in the sub-band. Stated another way, each counted peak represents a center frequency of a mode that is identified and counted in the sub-band and used in further processing steps. The remaining modes are discounted and omitted from further processing steps.

At block 330, the complete IR may be divided into sub-bands based on the number of detected peaks. This may result in non-uniform sub-bands. In order to achieve this result, an Audio FFT filter bank may be used. Each sub-band may be produced by filtering the IR with a causal N-tap finite impulse response (FIR) filter $h_r[n]$:

$$y_r[n] = x[n] * h_r[n] = \begin{cases} \sum_{m=1}^{M} a_m \sum_{l=0}^{n} h_r[l] z_m^{n-l}, & \text{if } n < N-1 \\ \sum_{m=1}^{M} \hat{a}_{mr} z_m^n, & \text{if } n \geq N-1 \end{cases}$$

whereby $$\hat{a}_{mr} = a_m s_{mr},\ \hat{s}_{mr} = \sum_{l=0}^{N-1} h_r[l] z_m^{-l},$$

$a_m$ is the complex amplitude and $z_m$ is the complex mode of the $m^{th}$ of M modes, $a_{mr}$ is the complex amplitude with a scaling factor. The first N−1 samples of the signal represent a start-up transient that does not exhibit the behavior of an exponentially damping sinusoid, and then afterwards the samples begin to follow such behavior. The filter effectively cuts out modes with center frequencies in the stopband.

Figure 4:
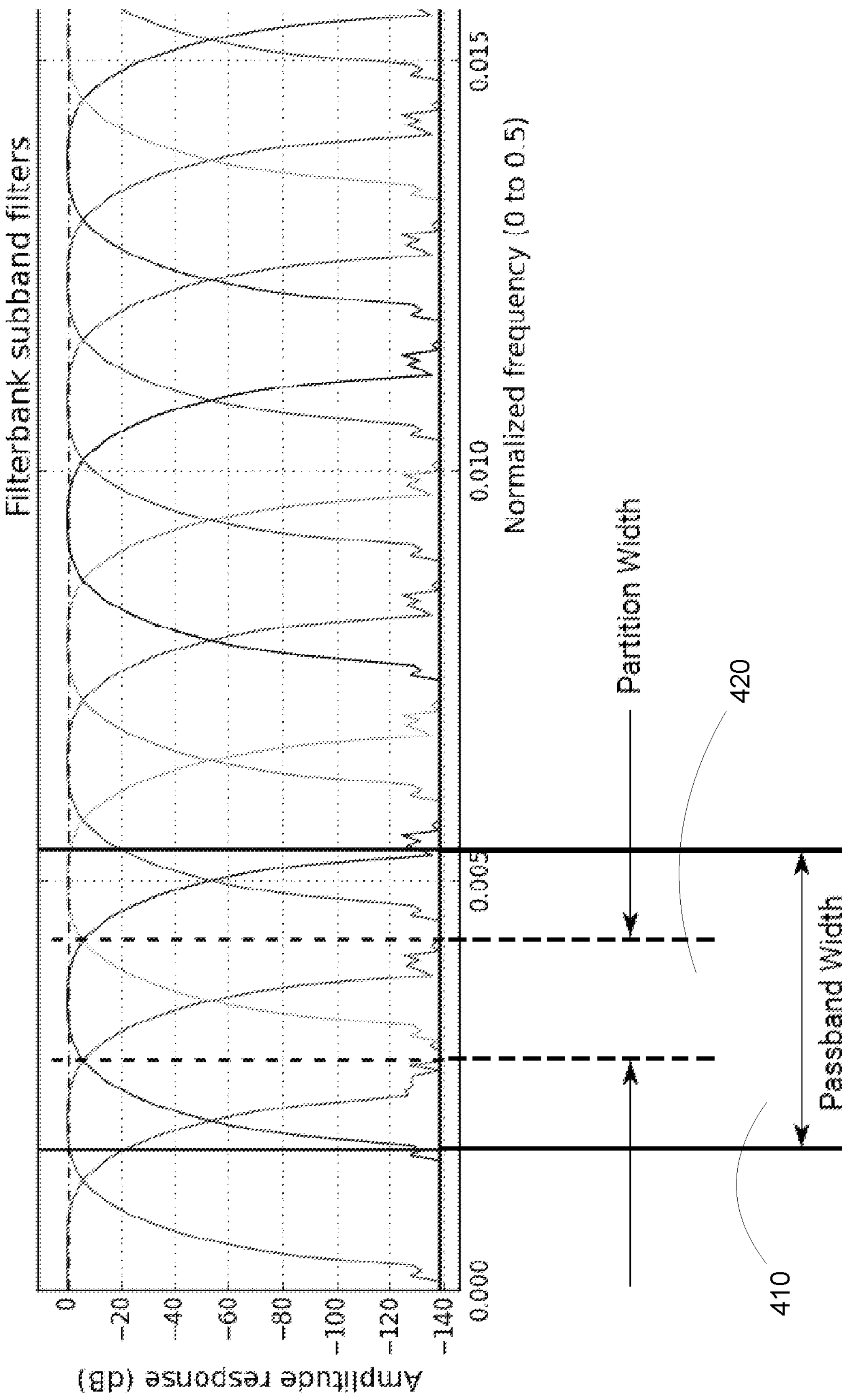
FIG. 4 is a representation of a filterbank according to an aspect of the present disclosure.

Windowing methods, which are known in the art, allow an FIR filter to be designed by truncating an IIR filter. The act of truncation expands the bandwidth of the FIR (as compared to the IIR filter). This in turn causes the sub-band filters to overlap in frequency, as shown in FIG. 4. The bandwidth of each FIR filter is constant across its partition, and begins to roll off as it approaches the end of its partition. This means that the modes outside of the partition will be attenuated, making those modes more difficult to estimate. For any given sub-band, modes that lie within the passband of that sub-band but outside of the partition will inevitably be estimated. However, those modes may appropriately be pruned or disregarded since they necessarily fall within the partition of the neighboring passband, and thus may be more reliably estimated there.

In one example of the filter bank being designed using a windowing method, first a number R brickwall filters may be chosen such that the sum of all frequency responses $H_r$ of the R filters is unity. Taking the inverse DTFT of the R filters shows that $$\sum_{r=1}^{R} H_r(e^{j\omega}) = 1 \leftrightarrow \sum_{r=1}^{R} h_r[n] = \delta[n],$$

in which $h_r$ is an impulse response of the $r^{th}$ filter among the R filters. Since the filters are brickwall filters, the impulse response is an IIR filter. Next, each channel's impulse response may be truncated via multiplication with a short window, thus creating an FIR filter. For instance, an N-tap window w[n] may be used so that each sub-band IR channel becomes $w[n]h_r[n]$. So long as w[0] is normalized to 1, this set of filters may still result in perfect reconstruction of the R filters (δ[n]), as can be seen from the following equations:

$$\sum_{r=1}^{R} w[n]h_r[n] = w[n]\sum_{r=1}^{R} h_r[n] = w[n]\delta[n] = w[0]\delta[n]$$

Time-domain multiplication by w[n] results in convolution between the ideal channel filter and the window in the frequency domain. This results in frequency-domain spreading of the filters, which causes the filter responses to overlap with one another in frequency. This results in a filter bank like the one shown in FIG. 4.

FIG. 4 shows a sub-band of the filter bank having a passband 410 with a given passband width. The passband width may be used to estimate the number of modes included in the sub-band (described above in greater detail). The passband may also have a partition 420 with a given partition width. The partition may be used to drop modes having a center frequency outside the partition width from the sub-band. It should be recognized that each partition region spans the original boundaries of a corresponding $r^{th}$ brickwall filter.

In the example of FIG. 4, the particular filter bank was designed using a Chebychev window. However, other windowing techniques known in the art may be used to create other usable filter banks in accordance with the present disclosure.

Returning to FIG. 2, at block 240, a parametric estimation algorithm may be used to determine respective parameters for the portion of modes included in the sub-band. This may be performed for each sub-band. One such parametric estimation algorithm that may be applied is the ESPRIT algorithm, which can be used to find frequency and damping parameters of an exponentially damped sinusoid (EDS). The algorithm takes advantage of the rotational invariance property of the complex sinusoids in order to solve for complex modes of a vector matrix representing the signal vectors of a signal.

Because the vector matrix is in an m-dimensional space (m being the number of complex modes), the processing necessary to solve for the complex modes increases exponentially as the number of modes increases. Stated another way, the model order of the ESPRIT algorithm corresponds to the number of modes that are estimated to be included in the sub-band. This makes processing the entire IR in a single matrix intractable. But by dividing the IR into sub-sands and then applying the ESPRIT algorithm to the sub-bands individually, instead of to all of the modes of the IR collectively, and by only solving for those modes that have a magnitude greater than the peak selection threshold, the amount of processing can be significantly reduced.

For a given subset of modes (e.g., modes of a given sub-band), a complex amplitude of each mode may be estimated. The estimation may be performed using a least squares method, such as the following minimization function of a, the matrix of the complex amplitudes of the modes:

$$\underset{a}{\operatorname{argmin}} \|x - Ea\|_2^2,$$

whereby x is a vector of sampled modes, and E are the complex sinusoids. This function may be solved in the frequency domain by taking the DFT of x and E, respectively labeled X and Y:

$$\underset{a}{\operatorname{argmin}} \|X - Ya\|_2^2.$$

Each column of Y may then be computed analytically using the geometric series:

$$Y_m[l] = \sum_{n=0}^{N-1} z_m^n e^{-j2\pi nl/N},$$

whereby z is the $n^{th}$ sample of the $m^{th}$ of N modes, and l is the $l^{th}$ of the sampled modes collected into the vector x.

Alternatively, the process of magnitude and phase estimation by again resorting to a divide and conquer approach using spectral filters. In this approach, the magnitudes may be estimated using the minimization function:

$$\underset{a \in I}{\operatorname{argmin}} \|H_k X - H_k Ya\|_2^2,$$

whereby X and Y are DFTs of x and E, respectively, and $H_k$ is the $k^{th}$ spectral filter associated with the $k^{th}$ sub-band of the plurality of sub-bands. Modes that have minimal overlap with the filter $H_k$ may be effectively ignored by removing columns from Y, so that only those frequencies that fall within $H_k$ need to be minimized.

The bandwidth $b_m$ of each mode m included in the subset of modes may also be estimated. This may be performed for each of the sub-bands, and this may be performed using the following equation: $b_m = \arccos(2-0.5*(e^{d_m}+e^{-d_m}))N/(2\pi)$, whereby $d_m$ is the damping factor and N is the DFT length of the mode.

The above equations may be applied to only those modes that fall within the passband of the spectral filter of the sub-band. For example, for the $k^{th}$ spectral filter associated with the $k^{th}$ sub-band, magnitude and phase may be estimated for only those modes for which the range $$\left[\omega_m - \frac{b_m}{2}, \omega_m + \frac{b_m}{2}\right]$$

intersects the passband of the filter. This may simplify the function.

Additionally, since estimation of the magnitude and phase for each mode is performed independent for each sub-band, the processing for each sub-band can be performed in parallel. Therefore, for a computer architecture having multiple cores with parallel processing capabilities, the mode parameter estimation can be sped up even further.

The estimated parameters may be stored in the memory of the system for further computation and subsequent applications.

Continuing with FIG. 2, at block 250, the modes of the plurality of sub-bands may be aggregated or otherwise recombined into a unified set. At block 260, the unified set of modes may be truncated. The result of the truncation may be a subset of modes.

For example, for each of the modes included in the set, determining a signal-to-mask ratio (SMR) of the mode based on a predetermined masking curve, and wherein one or more of the modes included in the set are truncated based on the determined SMR.

Figure 5:
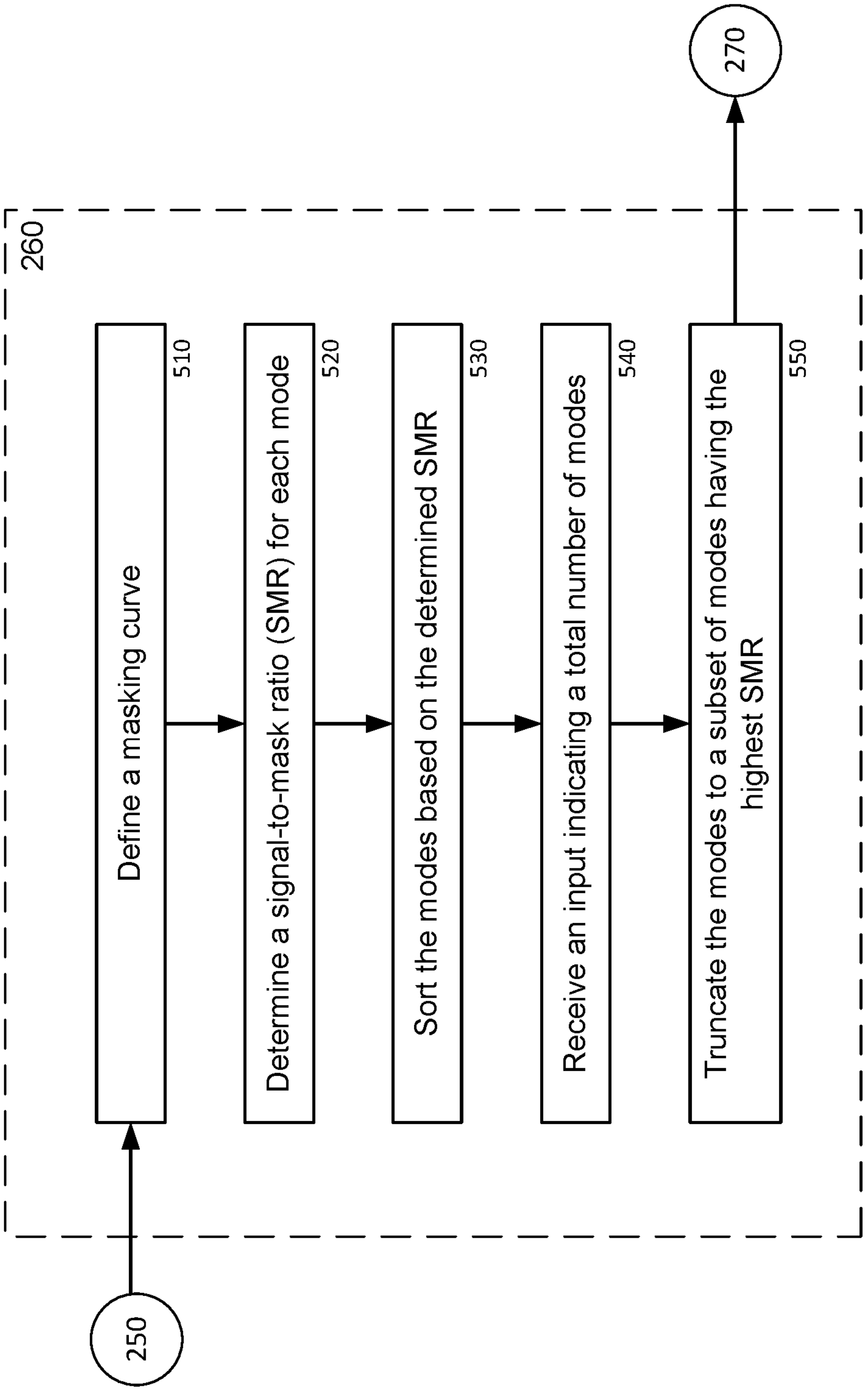
FIG. 5 is a flow diagram of another example sub-routine of the method illustrated in FIG. 2.

An example subroutine 500 for truncating the unified set of modes is shown in the flow diagram of FIG. 5.

At block 510, a masking curve may be defined. In some examples, the masking curve may be predetermined. The masking curve may be used to compare a relative magnitude of the modes, but in relation to the curve instead of solely in relation to one another. The masking curve may be a psychoacoustic model, designed to account for psychoacoustics for someone who may listen to the audio signal. One example psychoacoustic model is Psychoacoustic Model 1 from the ISO/IEC MPEG-1 Standard.

In some examples, the masking curve may involve tonal maskers and noise maskers. In some cases, including Psychoacoustic Model 1, a single noise masker may be created by summing the contribution of non-tonal maskers in each critical band of a signal. Alternatively, the sum may be replaced by an average, which has been found to model the masking curve more realistically.

At block 520, for each mode in the unified set, a signal-to-mask ratio (SMR) may be determined based on the frequency for each given mode. The SMR values may be stored in the memory of the system.

At block 530, the modes may be sorted according to the SMR for each mode. Then, at block 540, an input indicating a total number of modes may be received, and at block 550, the unified set of modes may be truncated down to a subset of modes having the modes with the highest SMR. The number of modes included in the subset may equal the total number input. The total number input may be a number that is less than or equal to the total number of modes of vibration included in the IR. The result is a subset of modes that excludes the modes having the least effect on the IR, and that includes the modes having the greatest effect on the IR, from a psychoacoustic perspective. This means that manipulation of the modal reverb parameters based on the subset of modes may be perceived by a listener as not different (or negligibly different) from manipulation of the parameters based on a complete set of identified modes of the complete IR.

Other methods for truncating modes may be used in place of or in conjunction with the subroutine 500 of FIG. 5. For example, modes with relatively low amplitudes (e.g., estimated using least squares) may be discarded immediately. For further example, underdamped modes (for which an envelope of the response is itself growing), are unstable and may be discarded. Additionally, or alternatively, modes may be organized and grouped into clusters using a K-means algorithm in order to compress the total number of modes.

In some instances, the ESPRIT algorithm may estimate an IR of a given acoustic space to contain between 6,000-12,000 modes. The number of modes that a user may wish to truncate from the 6,000-12,000 may vary from computer to computer depending on processing power, or from user to user depending on allowable time constraints or target audio quality. The subroutine 500 of FIG. 5 provides the scalability and flexibility to control these factors (e.g., time required to manipulate the IR parameters, quality and accuracy of the manipulated reverb effects). For instance, it may be desired to restrict the total number of modes to 2,000-3,000, or in other cases between 3,000-5,000. A number between 2,000-5,000 may then be input at block 440, and the ESPRIT-estimated modes may be truncated accordingly for subsequent processing steps.

Returning to FIG. 2, at block 270, the IR may be simplified to include parameters based on only the subset of modes. The simplified IR may then be used to manipulate a reverberation effect of an audio signal in order to make the audio signal sound as if it were played in an acoustic space having the impulse response of the simplified IR. Due to the techniques described herein, differences between the original IR of the acoustic space and the simplified IR may be negligible or unperceivable to a listener. As described above, the listener's ability to perceive differences may be based on several factors, including magnitudes of the various modes of vibration included in the IR, a psychoacoustic model, etc.

More generally, the present disclosure may enable a user to more effectively and efficiently manipulate reverberation effects of an audio recording or a portion of the audio recording. For instance, the user may wish to add an acoustic effect to a portion of the audio recording to make the recording sound as if it were played in a target acoustic space, such as a large hall or a small room. In operation, one or more processors would receive or otherwise derive an impulse response of the target acoustic space, convert the impulse response into the frequency domain, break the frequency plot into sub-bands, and then analyze each of the sub-bands—first separately and then as an aggregate—in order to select the most significant modes of the space (e.g., the subset of modes described above). The impulse response may then be simplified by discarding the remaining, less significant modes of the space. The one or more processors would then be capable of manipulating the audio signal using the simplified impulse response of the space. The result would be a modified audio recording.

In this regard, reverberation is only one example of a property of the audio recording that may be modified using a simplified set of modes of vibration, although modal modification is particularly useful for manipulating reverberation. This is in part because the mapping of modes to perceptually important parameters (room size, decay time) is relatively straightforward, and because the parameters of a modal filter bank can be stably modulated at audio-rate. Other approaches for audio signal or recording manipulation may be more effective for modifying other properties of a given signal.

The routines described above operate on the assumption that an IR can be represented using a sum of exponentially damped sinusoids (EDS). In this manner, the selected modes are effectively an estimation of EDS parameters of the IR, and controlling the selected modes individually approximates controlling the individual EDSs of the IR. This can achieve a wide variety of audio effects to the IR, including but not limited to morphing, spatialization, room size scaling, equalization, and so on.

Additionally, the routines described above generally describe processing of an impulse response of a chosen acoustic space. However, those skilled in the art will appreciate that similar mode selection concepts and algorithms may be applied to other digital inputs, such as audio signals, even without the audio signals being an impulse response of a selected space. For example, an audio signal may itself have a included therein an impulse response of an acoustic space in which the audio signal is recorded, and that impulse response may include a number of modes of vibration of the recording space that may be identified and selected using the techniques herein. For further example, the audio recording may be a drum recording including a number of modes of vibration, such that application of the ESPRIT algorithm could enable the modes of vibration to be separately modified. In this manner, the present application can achieve an improved resolution for any modally modifiable audio recording.

The above examples are described in the context of using the ESPRIT algorithm. However other algorithms may be used for the parameter approximation. More generally, parametric estimation algorithms other than ESPRIT may be used to deconstruct the signal into separate components (e.g., modes, damped sinusoids, etc.) and then estimate parameters of each separate component.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for generating a modal reverb effect for manipulating an audio signal, comprising:

receiving an impulse response of an acoustic space, the impulse response including a plurality of modes of vibration of the acoustic space;

dividing the impulse response into a plurality of sub-bands, each sub-band of the impulse response including a portion of the plurality of modes;

for each respective sub-band, using a parametric estimation algorithm, determining respective parameters of the portion of modes included in the sub-band;

aggregating the respective modes of the plurality of sub-bands into a set; and truncating the set of aggregated modes into a subset of modes, wherein truncating the set of aggregated modes comprises:

for each of the modes included in the set, determining a signal to mask ratio (SMR) of the mode based on a predetermined masking curve; and sorting the modes included in the set according to the SMR for each mode, wherein each mode included in the subset has an SMR greater than the SMR of each mode excluded from the subset.

2. The method of claim 1, wherein the impulse response is divided into a plurality of non-uniform sub-bands.

3. The method of claim 1, wherein dividing the impulse response into a plurality of sub-bands comprises passing the impulse response through a filter bank.

4. The method of claim 3, further comprising, for each respective sub-band signal, estimating a number of modes included in the portion of modes of the sub-band signal, wherein the filter bank includes one or more complex filters and for each sub-band has each of a passband width and a partition width narrower than the passband width, wherein the number of modes is estimated within the passband width, and wherein determining parameters of the respective modes included in the sub-band signal is performed for only the modes within the partition width.

5. The method of claim 1, further comprising, for each respective sub-band, estimating a number of modes included in the portion of modes of the sub-band.

6. The method of claim 5, wherein, for each respective sub-band, a model order of the parametric estimation algorithm applied to the sub-band is based on the estimated number of modes included in the portion of modes of the sub-band.

7. The method of claim 5, wherein estimating a number of modes included in the portion of modes of the sub-band comprises:

determining a peak selection threshold for the sub-band; and determining a number of peaks detected within the sub-band that are greater than the peak selection threshold, wherein the estimated number of modes is based on the determined number of peaks.

8. The method of claim 7, wherein the sub-band is derived from a Discrete Fourier Transform (DFT) of the impulse response, and wherein determining a peak selection threshold for the sub-band comprises:

detecting a maximum peak magnitude of the sub-band; and detecting a minimum peak magnitude of the sub-band, wherein the peak selection threshold is determined based at least in part on the maximum peak magnitude and the minimum peak magnitude.

9. The method of claim 8, wherein the peak selection threshold is determined based on: $t=M_{max}-a(M_{max}-M_{min})$, wherein $M_{max}$ is the maximum peak magnitude, $M_{min}$ is the minimum peak magnitude, and a is predetermined value between 0 and 1.

10. The method of claim 1, wherein, for each respective sub-band, determining respective parameters of the portion of modes comprises, for each sub-band to which the parametric estimation algorithm is applied, determining one or more of a frequency, a decay time, an initial magnitude or an initial phase of the portion of modes included in the sub-band.

11. The method of claim 10, wherein, for each respective sub-band, determining respective parameters of the portion of modes further comprises estimating a complex amplitude for each respective mode included in the sub-band.

12. The method of claim 11, wherein the sub-band is derived from a Discrete Fourier Transform (DFT), and wherein for each mode included in the sub-band signal, estimating the complex amplitude comprises minimizing an approximation error for each of the estimated complex amplitudes of the sub-band signal.

13. The method of claim 12, wherein the approximation error is minimized for only modes of the sub-band signal that fall within a passband of a corresponding spectral filter, wherein a different spectral filter corresponds to each of the sub-band signals, and wherein the different spectral filters cover the audible spectrum and do not overlap.

14. The method of claim 1, wherein the parametric estimation algorithm is an ESPRIT algorithm.

15. The method of claim 1, wherein, for each respective sub-band, determining respective parameters of the portion of modes comprises determining a peak selection threshold for the sub-band, and wherein the parameters are determined for the modes included in the portion of modes and having an amplitude greater than the peak selection threshold.

16. The method of claim 1, wherein truncating the set into a subset of modes further comprises:

receiving an input indicating a total number of modes, wherein the total number of modes is less than or equal to a number of modes included in the set; and truncating the set into a subset of modes having a number of modes equal to the total number of modes.

17. The method of claim 1, wherein the predetermined masking curve is based on a psychoacoustic model.

18. A system for generating a modal reverb effect for manipulating an audio signal, comprising:

memory for storing an impulse response; and one or more processors configured to:

receive an impulse response of an acoustic space, the impulse response including a plurality of modes of vibration of the acoustic space;

divide the impulse response into a plurality of sub bands, each sub band of the impulse response including a portion of the plurality of modes;

for each respective sub band:

estimate a number of modes included in the portion of modes of the sub band; and using a parametric estimation algorithm, determine respective parameters of the portion of modes included in the sub¬band signal;

aggregate the respective modes of the plurality of sub bands into a set;

for each of the modes included in the set, determine a signal to mask ratio (SMR) of the mode based on a predetermined masking curve;

sort the modes according to the SMR for each mode; and truncate the set of aggregated modes into a subset of modes, wherein each mode included in the subset has an SMR greater than the SMR of each mode excluded from the subset.

* * * * *